United States Patent Office

3,030,734
GROUND MULCH
John Kyle Brickey, 1417 N. Van Buren Ave.,
Ottumwa, Iowa
No Drawing. Filed Apr. 7, 1959, Ser. No. 804,565
2 Claims. (Cl. 47—9)

This invention relates to a ground mulch, and more particularly to a mulch that has insecticide, fungicide and color properties.

The use of mulches on the ground surface, and especially on the ground surface under plant life such as trees, shrubs, rose bushes, and like, is very old. Even ground corncobs have herebefore been used for making such ground mulches. Usually, these ground mulches have been used for purposes of preventing undesirable weed and grass growth and to prevent excessive moisture evaporation from the soil. However, many mulches promote the growth of undesirable fungus organisms, and even encourage the number of destructive worms, larvae, insects and like. Furthermore, certain mulches, and especially mulches made from ground corncobs, are an attraction to birds which scratch and otherwise adversely affect the status of the mulch.

Therefore, one of the principal objects of my invention is to provide an effective mulch that is a deterrent to growth of fungus in the soil or on the plant life extending above the mulch.

A further object of this invention is to provide a mulch that will destroy and/or repel undesirable insects, worms, and like.

A still further object of this invention is to provide a ground mulch that birds will not dissipate or destroy.

A still further object of my invention is to provide a mulch that is an excellent ground cover while permitting rain water to pass down through it and into the soil.

A still further object of my invention is to provide a ground mulch that is economical in manufacture and durable in use.

These and other objects will be apparent to those skilled in the art.

The basic material of my mulch is that of certain portions of a corncorb. I will now describe in detail my process of producing this new product of manufacture.

Chiefly, I only use the vascularized portion of the corncob. This is accomplished by first grinding the corncobs and then subjecting the ground material to a flow to air to get rid of the lighter particles consisting of the glume's and floret's chaff, and also the light pith which was originally the spongy center portion of the corn cob. Thus, I have remaining the vascularized portion of the corncob and this remaining portion is obviously granular. This remaining granular portion of the corncob is then impregnated with a suitable insecticide, a suitable fungicide, and a suitable dark dye preferably black in color. The ground vascularized portion of the corncob remains most effective as a mulch for a considerable lenght of time since its rate of decomposition is very slow. Also, by being free of the fine chaff and pith, it will not seal or pack the top surface of the soil. By being of granular character, rain water will rapidly pass through it and into the soil.

As above indicated, any suitable chemicals may be used in conjunction with the ground vascular portion of the corncobs. All or a part of the granular material may be so treated but to provide a prolonged and lasting effect of the insecticide and fungicide chemicals, I recommend that a small percentage of the mass have a high concentration of the chemicals. I recommend, as an illustration, that a chemical solution be prepared by volume substantially as follows:

| | Percent |
|---|---|
| Hexachloroepoxyoctahydro-endo-exo-dimenthano-naphthalene | 15.8 |
| Related compounds | 2.8 |
| Petroleum hydrocarbons | 73.4 |
| Inert ingredients | 8.0 |

The above solution is a good insecticide. A product sold under the trademark "Dieldrin" is excellent.

In the insecticide solution I place for complete saturation for about ten hours one percent of the corncob granules. They are then removed and dried. Obviously, with this concentration of insecticide in one percent of the mass, the dissipation of the insecticide into the soil will be slow. Next, I take the balance of the granules (ninety-nine percent) and treat the same lightly with a three percent solution of the above described insecticide, mixing with this solution a fungicide such as sold under the trademark "Ferbam." The amount of such fungicide used will equal approximately two-tenths ounce per bushel of granular material. This fungicide is usually in dry state and the measurement is therefore a dry measure. Also, into this latter solution I use a black dye, approximately one ounce per bushel of granular material. Any suitable dark dye may be used, the purpose of which will be discussed later. A good dye is National Basic Black #M63. Any suitable method of treating the remaining ninety-nine percent of the granules with the above described mixture may be used. I recommend the use of a rotary mixing drum and fogging the product with the solution to insure the even distribution of the chemicals onto the granules. Usually one gallon of the solution will be used to treat each bushel of granules. The one percent and the ninety-nine percent of the treated granules are then mixed and dried and the product is packaged for transportation, distribution, and use. The packaging should be in moisture-proof packages.

The reason for using the black dye is to discourage birds from interfering with the mulch after it has been placed on the ground. As before indicated, this is very important. The reason is not known, but from experimentation I have found that mulch so colored with the black dye will not be subject to bird hazards. I have found that birds will not go near mulch that has been colored or dyed into a black color.

Some changes may be made in my method and product without departing from the real spirit and purpose of my invention, and it is my intention to cover by my claims, any modified methods or use of equivalents which may be reasonably included within their scope.

I claim:

1. The method of producing a ground mulch, comprising, the grinding of corncobs into a granular mass, the separating of the chaff and pith from the vascularized portions of said corncobs in said granular mass, and lastly the treatment of the remaining vascularized portions of the granular mass with an insecticide, and a dark coloring agent.

2. The method of producing a ground mulch, comprising the grinding of corncobs into a granular mass, the separating of the chaff and pith from the vascularized portions of said corncobs in said granular mass, and lastly the treatment of the remaining vascularized portions of the granular mass with an insecticide, a fungicide, and a black dye.

References Cited in the file of this patent

UNITED STATES PATENTS

| | | |
|---|---|---|
| 572,019 | Marsden | Nov. 24, 1896 |
| 1,810,262 | Weber | June 16, 1931 |
| 1,882,377 | Whittelsey | Oct. 11, 1932 |
| 2,339,335 | Heckmanns | Jan. 18, 1944 |
| 2,974,030 | Geary | Mar. 7, 1961 |

OTHER REFERENCES

Condensed Chemical Dictionary, Fifth edition, published 1956 by Reinhold (N.Y.). Pages 35, 372, 551, relied on.

New York Times, Section one, page 45 (top of page), Sunday, July 13, 1958.